L. A. BRINKMAN.
INDEXING ATTACHMENT FOR LATHES AND THE LIKE.
APPLICATION FILED JULY 5, 1916.
1,225,106.
Patented May 8, 1917.
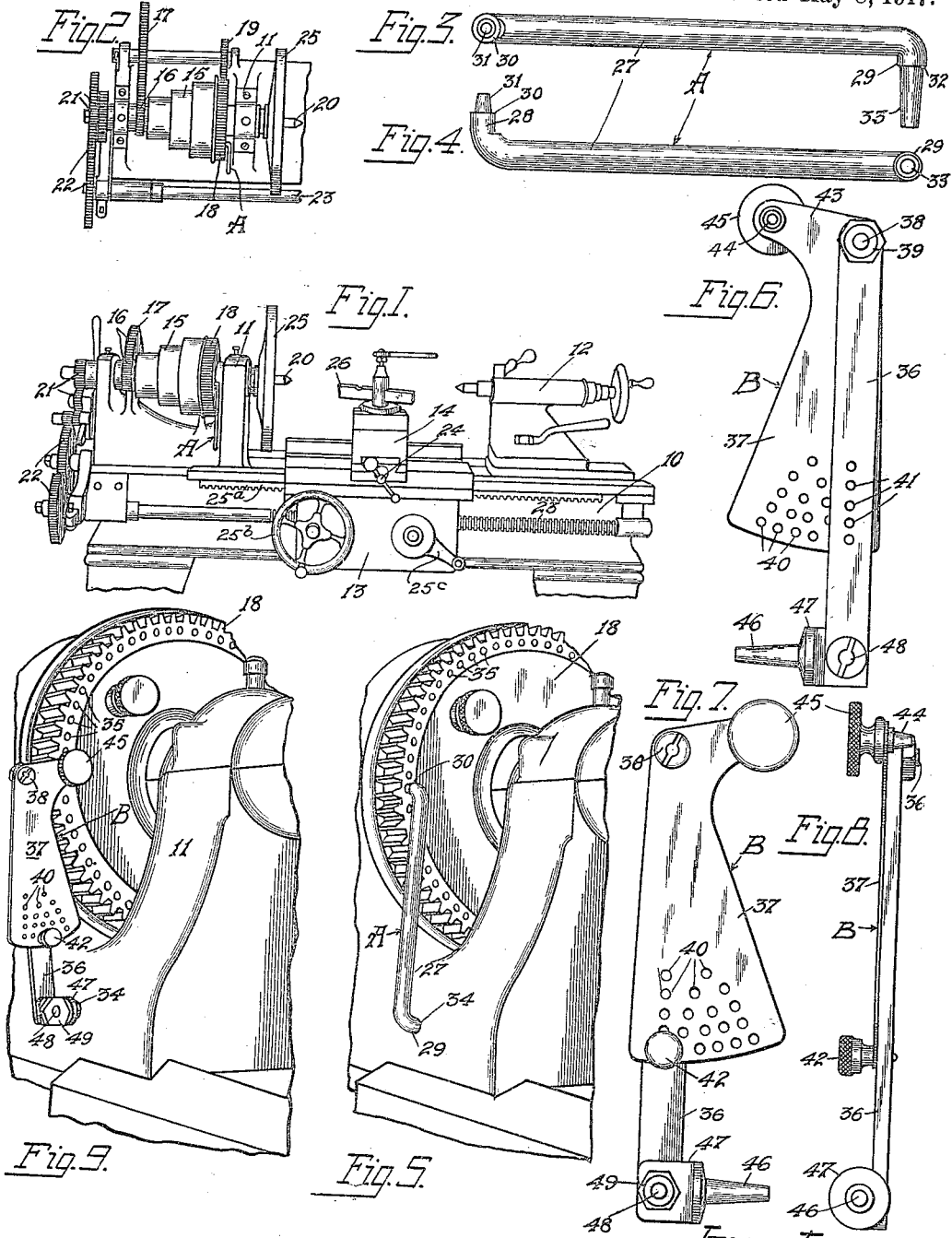

UNITED STATES PATENT OFFICE.

LEWIS A. BRINKMAN, OF CHICAGO, ILLINOIS.

INDEXING ATTACHMENT FOR LATHES AND THE LIKE.

1,225,106.  Specification of Letters Patent.  Patented May 8, 1917.

Application filed July 5, 1916. Serial No. 107,620.

*To all whom it may concern:*

Be it known that I, LEWIS A. BRINKMAN, a citizen of the United States, residing at Chicago, county of Cook, and State of Illinois, have invented certain new and useful Improvements in Indexing Attachments for Lathes and the like, of which the following is a specification.

The present invention relates to indexing attachments for turning lathes, boring mills, and the like, and the principal object of the invention is to provide a device which will enable the operator to scribe or index work upon the machine accurately and quickly and by the use of parts of the machine instead of by the slower drafting methods heretofore employed. Another object of the invention is to provide a device which shall be simple in construction, economical to manufacture and easily of application to, and use upon, the machines to which it is adapted.

In carrying out my invention I employ a retaining member or link which provides rigid connection between fixed and movable parts of the machine so as to hold the work upon the latter in desired fixed positions so that it may be readily scribed by the operator.

A fuller understanding of the invention will be had from the following detailed description taken in connection with the accompanying drawing, while the scope of the invention will be particularly pointed out in the appended claims.

Referring to the accompanying drawing, in which I have shown my invention applied to a turning lathe, Figure 1 is a perspective view of a lathe to which an indexing attachment constructed in accordance with my invention is applied; Fig. 2 is a plan view of a portion of the lathe showing the attachment and the back gears of the lathe; Fig. 3 is an elevation of the attachment shown in Figs. 1 and 2; Fig. 4 is a similar elevation taken in a direction at right angles to that of Fig. 3; Fig. 5 is a perspective view of a portion of the lathe showing this attachment in position; Fig. 6 is an elevation of a second form of the invention in which the attaching member is made up of a plurality of parts capable of adjustment between themselves; Fig. 7 is an elevation of the same taken from the opposite side of the device; Fig. 8 is an edge view of the same; and Fig. 9 is a perspective view of a portion of the lathe with the second attaching device in position upon it. Throughout these views like characters refer to like parts.

The lathe illustrated in the drawing is an engine lathe of well known construction and as it forms no part of the present invention need not be described in detail. It comprises a bed 10, head-stock 11, tail-stock 12, carriage 13, tool rest 14, cone 15, gear wheels 16, 17, 18, 19, spindle 20, gear wheels 21, 22, longitudinal feed screw 23, cross feed screw 24, work plate 25, rack 25ª, hand wheel 25ᵇ, and clutch lever 25ᶜ. Tool 26 is carried by the rest 14 and may be moved longitudinally upon the work by the travel of the carriage 13, or it may be carried crosswise of the work secured to the plate 25 by means of the rest 14 traveling crosswise of the carriage. The carriage 13 may be moved automatically by the screw 23 whenever the clutch lever 25ᶜ is in position to cause the usual half nuts (not shown to engage the screw. When the lever 25ᶜ is in non-engaging position, the carriage 13 may be moved by manually rotating the wheel 25ᵇ to cause its pinion (not shown) to engage rack 25ª. The rest 14 is moved crosswise of the carriage by rotating the cross feed screw 24.

The attachment A coöperates between the gear wheel 18 and a portion of the frame or head-stock 11 to hold the gear wheel in definite positions relative to the fixed parts of the machine. As clearly shown in Fig. 3, the attachment A consists of a bar having a straight central portion 27 and angular ends 28 and 29. In the present instance these ends extend in different directions from the body of the bar, as clearly illustrated.

The end 28 is provided with a shoulder 30 and a tapered pin 31. Similarly the end 29 is provided with a slight shoulder 32 and a tapered pin 33. The pin 33 is adapted to enter an opening 34 in the frame or head-stock 11, and the pin 31 is adapted to enter any one of a series of openings 35 formed in the side of the gear wheel 18 near its periphery. The tapering of the pins 31 and 33 makes them self-centering and consequently when they are inserted in their respective openings they insure an accurate setting for each position of the gear wheel 18.

The second form of the invention, which is shown in Figs. 6 to 9, inclusive, and designated B, comprises a bar 36 and plate 37 which are pivotally secured together by a screw 38 having a nut 39. This pivotal point is so positioned that the bar 36 and plate 37 overlap and the latter is sufficiently broad at one point to provide for a number of adjusting holes 40, which coöperate with similar holes 41 in the bar 36. By moving the plate 37 relative to the bar 36 so as to bring any one of the holes 40 into register with any one of the holes 41, a setting pin 42 may be passed through the openings to hold the bar and plate in adjusted position. The portion of the plate 37 adjacent to the pivot 38 is provided with an extension 43 which carries the lateral projecting tapered pin 44 which corresponds to the pin 31 of the attachment A. A head 45 on the opposite side of the plate 37 enables one to readily grasp the device so as to insert the pin 44 into the proper opening 35 in the gear wheel 18. The end of the bar 36 distant from the pivot 38 is provided with a tapered pin 46 which extends substantially in the direction of the plane of the plate 37. This pin is provided with a head 47 by which it is pivotally secured to the bar 36 by a pivot screw 48 having a nut 49. The pin 46 corresponds to the pin 33 of the attachment A, and, like it, is adapted for insertion into the opening 34 of the frame or headstock of the lathe.

From a consideration of the attachment B, it will be seen that the parts 36 and 37 may be adjusted so as to set the gear wheel 18 in a larger number of positions than is possible with the attachment A. With the latter, if there be sixty holes 35, then attachment A will be able to provide one set position of the gear wheel 18 for each six degrees. In other words, if the gear wheel 18 be set in a definite position and then the tool 26 used to scribe or index the work in the lathe, then by moving the pin 31 into the next hole 35 and again scribing or indexing the work, lines may be drawn upon the work which will be six degrees apart, measured upon a circle having a center concentric with the spindle 20. Now if the attachment B have its parts set so as to give the same distance between its pins 44 and 46 as exist between the pins 31 and 33 of attachment A, then the same result may be obtained with the attachment B without changing the relative positions of the bar 36 and plate 37. However, the attachment B is capable of providing finer gradations between the indexes upon the work. Thus if the parts when in the position illustrated give index marks six degrees apart, then if the plate 37 be moved so as to bring the next opening 40 in the lowermost row into position to be engaged by the setting pin 42, there will be a movement of the gear wheel 18 through one degree, or one-sixth of the space between the openings 35. By using the top row of openings 40 in the plate 37, the space between the gear wheel openings 35 will be divided into two parts. Likewise by using the second row this space will be divided into three parts; by using the third row, into four parts; and by using the fourth row, into five parts. It may be pointed out that the series of holes 40 are spaced such a distance that the movement of member 37 throughout the distance of the entire series, that is to say from the position shown in Fig. 6 to a position in which the extreme left hole 40 registers with the hole 41, will operate to bring pins 44 and 46 together a distance equal to the space between the centers of two adjacent holes 35. It should also be noted that the holes 40 of any one series are equally spaced apart.

It will be understood that various arrangements of holes in the coöperating members 36 and 37 may be employed to give different adjustments between the pins 44 and 46. The example given is merely typical. It will also be understood that the relative positions of the pins of the attachments may be different in applying the invention to other machines than that illustrated. In other instances well known substitutes for the pins may be employed. Likewise the invention may take other forms than those I have chosen for the purposes of the present application, and within the scope of the claims many changes may be made in the details of the forms illustrated without departing from the spirit and scope of the invention.

What I claim as new and desire to secure by Letters Patent of the United States is:

1. A machine indexing device comprising a pivotally connected bar and plate, a pin extending from said plate, a pin extending from said bar in a direction at an angle to said first pin, said plate and bar having a plurality of holes therein arranged to register in different combinations for different adjustments of the distance between said pins, and a setting pin for passing through registered openings to preserve said adjustments.

2. The combination with fixed and movable parts of a machine, of a retaining member for holding said parts in different adjusted positions comprising two relatively movable elements, means for holding said retaining member elements in different adjusted positions relative to each other, certain of said machine parts having openings therein, a pin extending in one direction and coöperating with certain of said openings to secure one of said retaining member elements to one of said machine parts, and a pin extending in another direction and coöperating with another of said openings to secure said member to the other of said machine parts.

3. A machine indexing device including two pivotally connected members, connecting means on each of said members for use in connecting them respectively to fixed and movable parts of the machine, said members having a plurality of holes therein arranged to register in different combinations for different adjustments of the distance between said connecting means, and a setting pin for passing through registered openings in said members to preserve said adjustments.

4. The combination with fixed and movable parts of a machine, of a retaining member for holding said parts in different adjusted positions, comprising two relatively movable elements, means for holding said retaining member elements in different adjusted positions relative to each other, certain of said machine parts having openings therein, a pin coöperating with certain of said openings to secure one of said retaining member elements to one of said machine parts, and means coöperating with another of said openings to secure said retaining member to the other of said machine parts.

5. The combination with the bed and head-stock of a lathe, of cone pulleys, a gear wheel located between said head-stock and said pulleys and rotatable with the latter, a carriage movable on said bed, a tool rest on said carriage, a feed screw for said carriage, gearing actuated by said gear wheel to rotate said feed screw, said gear wheel having a series of openings near its periphery in that side nearest said head-stock, each of said openings extending in a direction substantially at right angles to the plane of said gear wheel, said bed having an opening in its front side between the plane of the adjacent face of said gear wheel and the adjacent face of said head-stock, said opening extending in a direction substantially parallel to the plane of said gear wheel, and an attachment for holding said gear wheel in different positions comprising a pin at its lower end shaped so as to fit snugly into said single opening in said bed, a pin at its upper end shaped so as to fit snugly into any desired one of said series of openings in said gear wheel, and means for holding said pins a constant distance apart when in position in said openings, said means being of such length as to bring the upper pin into position for engagement with those openings in said gear wheel which are substantially directly above the opening in said bed and directly forward of the axis of said gear wheel.

In testimony whereof I have hereunto subscribed my name this 1st day of July, A. D. 1916.

LEWIS A. BRINKMAN.

Copies of this patent may be obtained for five cents each, by addressing the "Commissioner of Patents, Washington, D. C."